United States Patent [19]

Bertram et al.

[11] Patent Number: 5,681,220

[45] Date of Patent: Oct. 28, 1997

[54] KEYBOARD TOUCHPAD COMBINATION IN A BIVALVE ENCLOSURE

[75] Inventors: Randal Lee Bertram; James Lee Combs; Gerald Joseph Capaci, all of Lexington, Ky.

[73] Assignee: International Business Machines Corporation, Armonk, N.Y.

[21] Appl. No.: 215,033

[22] Filed: Jun. 18, 1994

[51] Int. Cl.[6] .................................................. A63F 9/00
[52] U.S. Cl. .............................. 463/37; 463/46; 463/47; 345/169; 345/173
[58] Field of Search ........................... 463/36, 37, 39, 463/47, 46; 345/158, 182, 168, 169, 173; 364/189

[56] References Cited

U.S. PATENT DOCUMENTS

| | | |
|---|---|---|
| 4,156,928 | 5/1979 | Inose et al. . |
| 4,202,041 | 5/1980 | Kaplow et al. . |
| 4,276,541 | 6/1981 | Inoue et al. . |
| 4,279,021 | 7/1981 | See et al. . |
| 4,280,121 | 7/1981 | Crask . |
| 4,353,552 | 10/1982 | Pepper, Jr. ............................. 463/37 |
| 4,425,099 | 1/1984 | Naden . |
| 4,527,250 | 7/1985 | Galdun et al. ......................... 345/168 |
| 4,587,630 | 5/1986 | Straton et al. . |
| 4,656,317 | 4/1987 | Tsugei et al. . |
| 4,663,704 | 5/1987 | Jones et al. . |
| 4,725,694 | 2/1988 | Auer et al. . |
| 4,736,191 | 4/1988 | Matzke et al. . |
| 4,811,240 | 3/1989 | Ballou et al. . |
| 4,859,841 | 8/1989 | Hershberger . |
| 4,885,580 | 12/1989 | Noto et al. . |
| 4,899,137 | 2/1990 | Behrens et al. . |
| 4,899,292 | 2/1990 | Montagna et al. . |
| 4,899,377 | 2/1990 | Bauer et al. . |
| 4,908,845 | 3/1990 | Little et al. . |
| 4,912,640 | 3/1990 | Tsugei . |
| 4,922,060 | 5/1990 | McJunkin . |
| 4,945,214 | 7/1990 | Hancock et al. . |
| 4,973,960 | 11/1990 | Mount, II . |
| 5,008,854 | 4/1991 | Maeda et al. . |
| 5,053,585 | 10/1991 | Yaniger . |
| 5,059,960 | 10/1991 | Rosenberger et al. . |
| 5,086,503 | 2/1992 | Chung et al. . |
| 5,128,862 | 7/1992 | Mueller . |
| 5,157,384 | 10/1992 | Greanias et al. . |
| 5,226,160 | 7/1993 | Waldron et al. . |
| 5,231,380 | 7/1993 | Logan . |
| 5,241,303 | 8/1993 | Register et al. ........................ 345/168 |

FOREIGN PATENT DOCUMENTS

| | | |
|---|---|---|
| 0 334 745 A1 | 9/1989 | European Pat. Off. . |
| 0 483 992 A2 | 5/1992 | European Pat. Off. . |
| 4-100012 A | 1/1992 | Japan . |
| 2 178570 A | 2/1987 | United Kingdom . |

OTHER PUBLICATIONS

Method for Supporting an Absolute Pointing Device, IBM Technical Disclosure Bulletin, vol. 35, No. 6, Nov. 1992.
Method of Providing On–Screen Keyboard for Touch-Sensitive Systems Without Affecting Application Programs, IBM Technical Disclosure Bulletin, vol. 33, No. 5, Oct. 1990.

*Primary Examiner*—Jessica Harrison
*Assistant Examiner*—James Schaaf
*Attorney, Agent, or Firm*—Calfee, Halter & Griswold; Daniel McConnell

[57] ABSTRACT

An input device for a computer system having a central processing unit mounted in a central enclosure comprising a keyboard and touchpad mounted in a hinged bivalve enclosure. The input device is tethered to the central enclosure by a conductive tether.

17 Claims, 6 Drawing Sheets

KEYBOARD TOUCHPAD COMBINATION IN A BIVALVE ENCLOSURE

RELATED APPLICATIONS

The present application is thought to be related to the following pending applications:

application Ser. No. 08/210,672, filed Mar. 18, 1994, and entitled "INPUT DEVICE HAVING TWO JOYSTICKS AND TOUCHPAD WITH DEFAULT TEMPLATE" (further identified as Attorney Docket No. BC9-93-100 (21322/00186)); and application Ser. No. 08/210,610, filed Mar. 18, 1994, and entitled "COMPUTER SYSTEM WITH TOUCHPAD SUPPORT IN OPERATING SYSTEM" (further identified as Attorney Docket No. BC9-93-101 (21322/00187)).

FIELD OF THE INVENTION

The present invention relates generally to digital computer systems and, more specifically, to a computer system having an input device comprising a keyboard and touchpad housed within a hinged bivalve or "clamshell" enclosure.

BACKGROUND OF THE INVENTION

Video graphics computer systems are well known, popular consumer products. A typical system includes a data processing unit that connects to an ordinary television set for displaying images of a game or other application. The data processing unit receives controlling software from a read only memory (ROM) that is usually packaged in the form of a cartridge. The cartridge is removably plugged into the data processing unit. At least one input device, such as a keyboard, touchpad, mouse, joystick, touchscreen, switch pad, or light gun, is also connected to the data processing unit to allow the user to input information, such as positional information or text, that is used by the controlling software to execute the application.

The data processing unit typically has a single central processing unit (CPU) and associated volatile and non-volatile memory, including all random access memory (RAM) and bootstrap read-only memory (boot ROM), a television (RF video) signal generator, and an input/output (I/O) processor to interface to the various pointing devices. These devices are in circuit communication. One distinguishing characteristic of these systems is the use of a motherboard or system planar to electrically connect these components together.

Keyboards are well known input devices used to communicate discrete bits of information to digital systems. Common examples of keyboards include the well known "QWERTY" typewriter-like keyboard used to input textual and command data to digital computer systems and the well known musical keyboard used to input musical notes to mechanical and electronic musical instruments such as pianos, organs, harpsichords, etc. Typically each key is associated with one or more fixed inputs, which are activated by pressing the key.

Touchpads are coordinate type pointing devices used to input coordinate type data to computer systems. The touchpad is typically a pressure-sensitive bounded plane capable of detecting localized pressure at its surface. When a user touches the surface with a finger, stylus, or the like, the touchpad reports to the attached computer system the coordinates of the location touched. In response, the computer performs the function, if any, associated with the location pressed.

Typically one or more regions of the touchpad are assigned to certain functions within the system or within application programs. The user is made aware of what function is associated with which each region by a template. A template is a sheet with a graphic design and is typically placed over and touching the touchpad surface. The graphic design typically maps out regions of the touchpad surface and the regions are typically labeled to provide a reminder to the user as to the functions associated with the various mapped regions.

A relatively recent trend in digital computer systems is to provide a QWERTY keyboard and a pointing device, such as a touchpad, mouse, or touchscreen.

Keyboard/touchpad combinations are not unknown in the art. For example, U.S. Pat. No. 5,231,380 to Logan discloses a small touchpad, which is used to control a cursor on the display, attached below the space bar of a keyboard for use in a personal computer system. U.S. Pat. No. 5,008,854 discloses the use of a large touchpad separate from the keyboard in a personal computer system.

However, no input device is shown having a practical, portable touchpad-keyboard combination as a remote input device for a computer system.

SUMMARY OF THE INVENTION

According to the present invention, an input device comprising a keyboard and touchpad combination is provided in a hinged bivalve or "clamshell" enclosure. The input device is in circuit communication with the data processing unit via a wire tether or wireless communication link.

It is therefore an advantage of the present invention to provide a keyboard combined with a full size touchpad that may conveniently be closed to reduce the size of the entire package for carrying and storage.

It is a further advantage of this invention to provide a portable touchpad-keyboard combination for use with a computer system.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

FIG. 2A is a perspective view of one embodiment of the input device of the present invention;

DETAILED DESCRIPTION OF THE PREFERRED EMBODIMENTS

Figure 1A:
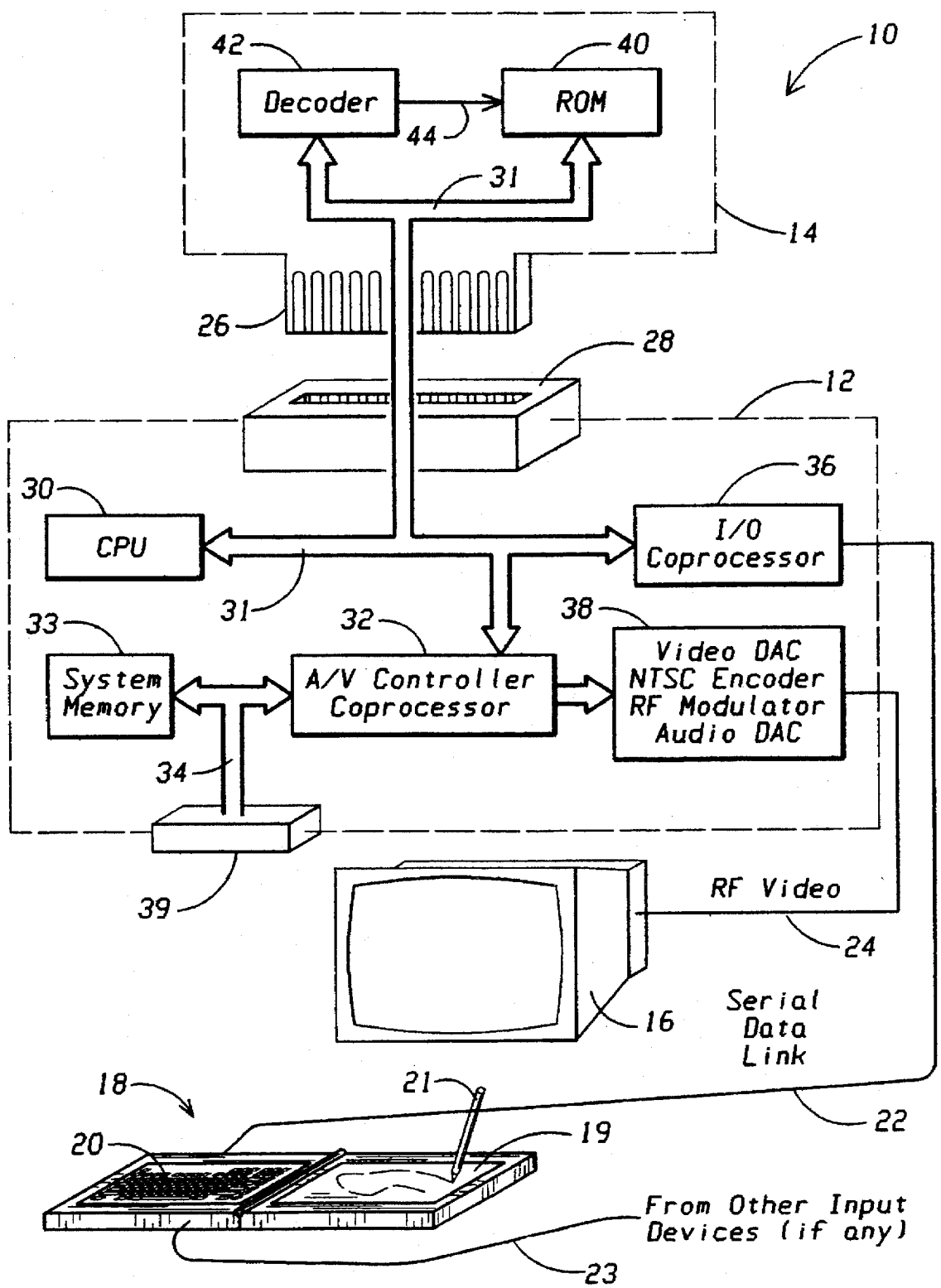
FIGS. 1A and 1B are block diagrams showing the general layout of the system of the present invention.
Figure 1B:
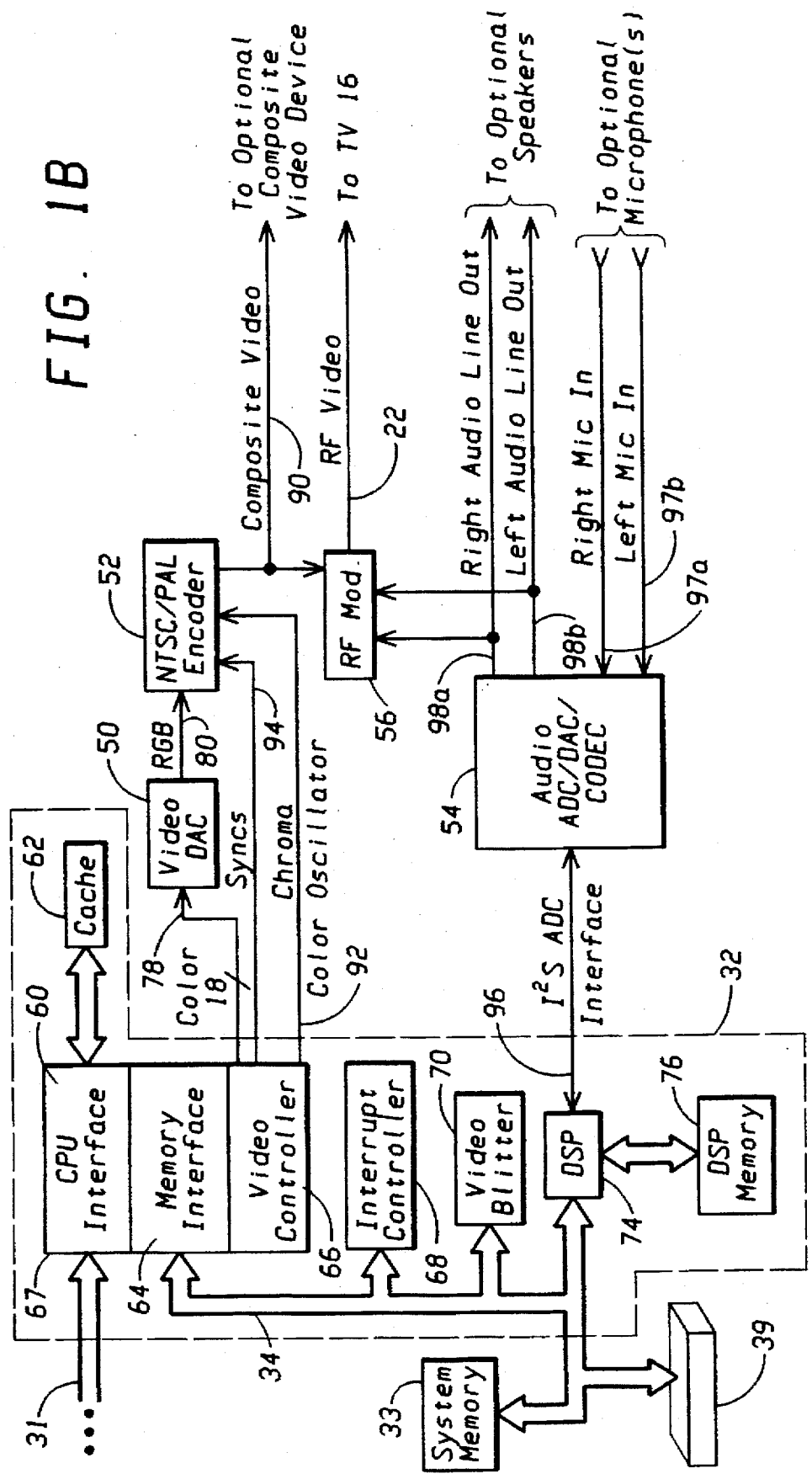

Referring to FIGS. 1A and 1B, a computer system 10 of the present invention is shown. As shown in FIG. 1A, the system 10 comprises a data processing unit 12 with a program cartridge 14 removably connected thereto. Also connected to the data processing unit 12 is a standard television set (TV) 16, and an input device 18, which has a touchpad 19 and a keyboard 20. The input device 18 sends to the data processing unit 12 coordinate type data corresponding to the location of a touch of a finger, stylus 21, or the like on the touchpad 19. In addition, the input device 18 sends to the data processing unit 12 data corresponding to keystrokes of the keys of the keyboard 20. Although not shown in FIG. 1A, the standard TV 16 can be replaced with a pair of speakers and a display device that accepts a composite video signal. The input device 18 connects to the data processing unit 12 via a serial data link 22. The TV 16 connects to the data processing unit 12 via an RF video line 24.

The cartridge 14 has an edge card connector, indicated generally at 26, which connects to a cartridge connector 28 thereby electrically connecting devices in the cartridge 14 to devices in the data processing unit 12.

The processing unit 12 comprises a central processing unit (CPU) 30, having a SYSTEM bus 31 associated therewith, an audio/video (A/V) controller/coprocessor 32, a system memory 33, which is connected to a SYSTEM' bus 34 generated by the A/V controller/coprocessor 32 from the SYSTEM bus 31, first and second decoder chips (not shown), an I/O coprocessor 36, two cartridge connectors (one indicated at 28, the other not shown), additional circuitry 38 required to generate the audio and video signals, and an expansion connector 39. These devices are connected in circuit communication as shown in the Figures. The additional circuitry 38 is shown in FIG. 1B and discussed in more detail in the text accompanying FIG. 1B.

The CPU 30 generates multiple buses: a DATA bus, an ADDRESS bus, and a CONTROL bus, as are well known in the art. These three buses are collectively referred to as the SYSTEM bus 31. In the preferred embodiment, the CPU 30 is an 80376, manufactured by Intel Corp., 3065 Bowers Ave., Santa Clara, Calif., 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011H (0011 in hexadecimal notation) state with bit 0 forced to a logical ONE, effectively making the 376 operate in a 32-bit memory mode. Paging is enabled to allow virtual 386 operation.

The A/V controller/coprocessor 32 generates three spare general purpose I/O decoder lines (GPIO1, GPIO2, and GPIO3) from the SYSTEM bus 31, each providing a 32-bit I/O address range. The general purpose decoders can be used to provide three active low chip enables to devices external to the A/V controller/coprocessor 32. In the data processing unit 12, the general purpose decoders are used to decode address ranges to the I/O coprocessor 36 (GPIO1) and the two cartridge connectors (GPIO2 and GPIO3). The remaining circuitry of the A/V controller/coprocessor 32 is discussed below.

The system memory 33 comprises screen RAM, system RAM, and bootstrap ROM (all not shown). The on-board screen RAM and system RAM is 1 megabyte of 32-bit DRAM. Suitable DRAM are a pair of TCS14170BJ 256 kilobyte by 16-bit memory chips, manufactured by Toshiba, configured to provide a 32-bit memory. A portion of the address space of the CPU 30 is decoded to a number of eight-bit registers within the A/V controller/coprocessor 32. All internal locations are on even address boundaries; word-wide I/O reads and writes can be performed where appropriate. In this particular embodiment, the byte-wide writes cannot be performed on word-wide registers and I/O cycles cannot be used to access odd addresses.

The bootstrap ROM is always 16 bits wide. The bootstrap ROM comprises two 27C512 erasable programmable read-only memories, manufactured by numerous manufacturers, thereby giving 128K of bootstrap ROM. Following a reset, the one megabyte window from F20000H to FFFFFFH containing ROM and internal memory is repeated throughout the 16 megabyte address range.

The system memory 33 is shared between a number of devices. The A/V controller/coprocessor 32 is the arbitrator for the system memory 33; therefore, the SYSTEM bus 31 is modified to a SYSTEM' bus 34 (comprising a DATA' bus, an ADDRESS' bus, and a CONTROL' bus, all not shown) by the A/V controller/coprocessor 32. Thus, the system memory 33 is accessed via the SYSTEM' bus 34.

The I/O coprocessor 36 interfaces the CPU 30 to numerous input devices, such as the input device 18 and optional devices such as a pair of joysticks (not shown), controllers (not shown), a mouse (not shown), and a printer (not shown). In the preferred embodiment, the I/O coprocessor 36 is a preprogrammed MC68HC705C8 (hereinafter "68HC705"), manufactured by Motorola Corp, running at 2 MHz. The 68HC705 I/O coprocessor 36 is interfaced to the CPU 30 by configuring the 68HC705 as a peripheral device: (1) PA0-PA7 are connected to D0-D7 of the DATA bus; (2) PB7, PB1, and PB2 are connected to GPIO1 (a 32-byte address range decoded by the A/V controller/coprocessor 32, as described below), A1, and A2, respectively, of the CONTROL bus and ADDRESS bus; and (3) PB3, PB4, and PB5 are connected to ADS, READY, and W/R, respectively, of the CONTROL bus. The I/O coprocessor 36 is decoded by the A/V controller/coprocessor to have four 16-bit addresses in I/O space (referred to herein as AS0, AS2, AS4, and AS6).

The program inside the 68HC705 interfaces to the CPU 30 as follows. The 68HC705 is designed to attach directly to the processor bus and act as an I/O port to the CPU 30. A pair of internal latches holds data passing between each of the processors until the other is ready to receive it. Status bits to each processor indicate the condition of the data latches. Each can tell if the previous data has been read and if any new data is waiting to be read by checking the status bits.

The I/O coprocessor 36 implements, inter alia, the following functions: (1) a 50 ms timer, (2) a serial controller link for receiving communication packets from the input devices, (3) a cartridge/expansion sense, for determining the presence or absence of a cartridge 14 in each cartridge connector and the presence or absence of an expansion device or CD drive in the expansion connector, (4) a system reset, and (5) an I²C nonvolatile RAM (NVRAM) interface. The I/O coprocessor 36 also implements an optional DSA compact disk control serial line to allow communications with an optional CD device.

The 50 ms timer is implemented by configuring the watchdog timer of the 68HC705 I/O coprocessor 36 to expire at regular 50 millisecond intervals. Each time the watchdog timer expires, the I/O coprocessor 36 interrupts the CPU 30 using analog interrupt 0 (AI0) of the A/V controller/coprocessor 32 (the A/V controller/coprocessor interrupts the CPU via the IRQ line in response to the I/O coprocessor pulling AI0 low). The CPU enables and disables the 50 ms timer by writing either the byte 0F0H or the byte 00H, respectively, to the I/O port AS0. The timer defaults to being enabled.

During the interrupt acknowledge cycle of the CPU, the A/V controller/coprocessor asserts the address of the interrupt handling routine. The interrupt handling routine causes the CPU 30 to read one or more bytes from the 16-bit I/O port AS0, which corresponds to the I/O coprocessor. During each read of I/O port AS0, the A/V controller/coprocessor 32 to selects the I/O coprocessor 36, thereby allowing a data transfer between the CPU 30 and the I/O coprocessor 36.

The I/O coprocessor 36 will always have one byte to be transferred to the CPU in response to the 50 ms interrupt. The lower nibble of this byte contains the number of expirations of the 50 ms time since the last interrupt acknowledge cycle and the upper nibble of this byte contains the number of I/O device messages to be transferred to the CPU. If the 50 ms timer is disabled, then the lower nibble of this byte will be zero. If more than 15 messages have been received, then 15 is sent in the upper nibble and any remaining messages are sent during the next transfer. Depending on the contents of this first byte, the CPU might read subsequent bytes from the I/O coprocessor 36, which will, for the most part, be packets of data from input devices. Typically, the input devices will only send messages when their respective states change, thereby keeping message transmission frequency very low.

The input device 18 and all other input devices are connected to the I/O coprocessor 36 via the serial data link 22. The individual input devices (e.g., the input device 18) transform the movements of the control devices into a format suitable for transmission along the serial link 22. The input device 18 sends data packets via the serial data link 22 to the system unit 12. As will be explained below, the structure of the data packets differ depending on the type of input device. Coordinate type devices (mouse, analog joystick, touchpad, etc) have a different data packet structure than a switch closure type of device (keyboard, digital joystick, switch pad, etc).

The serial controller link 22 consists of three (3) lines: a data receive line, a VCC (+5 VDC) line, and a ground line. The 68HC705 implements the data receive line of the controller serial link using the PD0/RDI pin of the 68HC705. This pin is designed to be used as an interface to serial devices using the well known asynchronous format. Serial transmissions have the following format: 4800 bits per second, no parity, 8 data bits, and one stop bit. A clocked synchronous format could be used in the alternative. The serial controller link 22 is connected to external devices by a six-conductor mini-din plug connector (not shown), which are well known in the art. Input devices are daisy chained, thus a single device physically connects to the data processing unit 12. For example, if a so-called mouse pointing device is added to the system 10, the mouse is connected to the input device 18, which is connected to the processing unit 12.

The cartridge sense and expansion sense are for determining the presence or absence of a cartridge 14 in each cartridge connector or the expansion connector and is implemented by having the I/O coprocessor 36 poll a pin of the cartridge connector 28. The pin is pulled to a logical ONE by a suitable pullup resistor (not shown) on the system planar and a properly connected cartridge 14 pulls the pin to a logical ZERO. Thus, a ONE at each cartridge sense indicates the absence of a cartridge 14 and a ZERO indicates the presence of a cartridge 14. Likewise, a ONE the expansion sense indicates the absence of an expansion device, such as an optional CD drive, and a ZERO indicates the presence of an expansion device.

The reset is implemented by giving the I/O coprocessor 36 control over the reset signal of the A/V controller/coprocessor 32, which in turn controls the reset signal of the CPU 30. The CPU 30 can command the I/O coprocessor 36 to reset the system 10 by causing the I/O coprocessor 36 to reset the A/V controller/coprocessor, which in turn resets the CPU 30. The CPU causes the I/O controller to generate a system reset by writing the byte 0FFH to I/O port AS0. In addition, the I/O coprocessor 36 monitors the optional reset switch (not shown) for the system and resets the system when it detects a switch closure.

Finally, the I/O coprocessor implements an I$^2$C nonvolatile RAM (NVRAM) interface to read, write, and verify the contents of 512 bytes of nonvolatile system RAM. The NVRAM (not shown) comprises a PCF8594 manufactured by Philips Semiconductor and is in circuit communication with the I/O coprocessor via the I$^2$C interface. More than one PCF8594 can be cascaded to provide more NVRAM capability. To access the NVRAM, a three-byte sequence is used. All three bytes are accessed through I/O port AS0. The first byte written to the I/O coprocessor by the CPU indicates whether the transfer is a read or a write and gives the I/O coprocessor a segment address. The lower nibble of this byte indicates the type of transfer: 01H indicates a write from NVRAM and 02H indicates a read from NVRAM. The upper nibble of this byte is a 4-bit segment number corresponding to a 256-byte segment of NVRAM. With 512 bytes of NVRAM, only the bottom two segments (0 and 1) are used. For both reads and writes, the next byte is the same—the next byte is written by the CPU and is the address of the byte being accessed within the segment. The last byte is either written to or read from the I/O coprocessor by the CPU and is the data byte read from or to be written to the NVRAM.

In the alternative, the I/O coprocessor can be implemented in other ways. For example, a tristated readable shift register might suitably receive the information from the serial data link 22. In that case, the CPU 30 periodically reads the shift register to access the data packets from input devices.

The first decode chip (not shown) is in electrical circuit communication with the CPU 30, the A/V controller/coprocessor 32, and the two cartridge connectors 28 (the other not shown). The first decode chip accepts as inputs the upper two address lines of the SYSTEM bus 31, decodes the 16 megabyte address space of the 80376 CPU 30 into four 4 megabyte regions, represented by three chip select lines: two for the cartridge connectors 28 (the other not shown) and one for the A/V controller/coprocessor 32. The upper four megabytes and the lower four megabytes are decoded to the A/V controller/coprocessor chip select and the two remaining four-megabyte regions are decoded to two cartridge connector chip selects.

The second decoder chip (not shown) is used to implement the chip select for the expansion connector 39. The second decode chip is in circuit communication with the A/V controller/coprocessor 32 and the expansion connector 39 along the SYSTEM' bus 34. The second decode chip permits the A/V controller/coprocessor 32 to decode a 128K block of system ROM starting at F20000H. The range from F40000H to FFFFFFH is decoded by the second decode chip for use by the expansion connector 39. This block of ROM decoded by the second decode chip is used to add ROM to the system 10 via the expansion connector 39.

The data processing unit 12 also has a pair of cartridge connectors (one indicated at 28, the other not shown) for placing a cartridge 14 in circuit communication with the CPU 30 and other system components. The cartridge 14 connects to the connector 28 of the data processing unit 12 via a gold plated 62-pin (two rows of 31 conductors) edge card connector 26. The processor unit 12 has two cartridge connectors 28 for accepting the edge card connections of the edge card connector 26. The cartridges 14 have gold plated card edge connections to match the conductors of the connectors 28, allowing the cartridges 14 to be pluggably connected to the processor unit 12. The following signals are communicated to external devices via the cartridge connectors 28 (the other not shown): SYSTEM bus 31 signals, a cartridge sense line, power, ground, analog interrupt 1 or 2 (each cartridge has a unique interrupt), GPIO 2 or 3 (each cartridge has a unique chip select), a lock line (which is a typical signal of the 80376 and 80386SX SYSTEM bus 31), and a cartridge select, which is generated by the first decode chip. In the alternative, the signals needed to connect to an optional CD drive can also be connected to external devices via the cartridge connector 28.

In addition, the processor unit 12 has a single 112-pin (two rows of 56 pins each) edge card expansion connector 39. The expansion connector 39 allows devices to add more memory to the system memory 33 and to add various other features. Devices connected to the expansion connector 39 have gold plated card edges to match the expansion connector, allowing the devices to be pluggably connected to the processor unit 12. The following signals are communicated to external devices via the expansion connector 39: SYSTEM' bus signals, an expansion connector 39 sense line, power, ground, CAS and RAS lines, and an expansion connector 39 select, which is generated by the second decode chip. In the alternative, the signals needed to connect to an optional CD drive can also be connected to external devices via the expansion connector 39.

The program cartridge 14 comprises a program ROM 40 and a decoder 42. In the alternative, the decoder 42 can be designed into the processing unit 12. The program ROM 40 contains code suitable for execution on the CPU 30 in a read only memory format. In the alternative, other memory types, such as battery-backed RAM can be used as the storage device in the cartridge 14. The program ROM 40 is in circuit communication with the CPU 30, as shown in FIG. 1A.

The address decoder 42 within the cartridge 14 decodes the full width of the ADDRESS bus to a memory range appropriate for the program ROM 40 and generates a chip select signal 44 required by the ROM 40, as is well known in the art. The address decoder 42 is implemented in a 16V8 programmable array logic (PAL), which is well known in the art and is manufactured by numerous manufacturers, e.g., AMD Corp. If the decoder 42 is designed into the processing unit 12, then the select 44 is electrically communicated to the ROM 40 by the connector 26.

Referring now to FIG. 1B, the additional circuitry 38 of FIG. 1A is shown connected to the A/V controller/ coprocessor 32. The additional circuitry 38 comprises four devices: a video digital-to-analog converter (video DAC) 50, an NTSC/PAL ("PAL" referring to the well known European television signal standard) encoder 52, an audio digital-to-analog converter/analog-to-digital converter/ compressor/decompressor (ADC/DAC/CODEC) 54, and an RF modulator 56. Each is connected as shown in the Figures.

The Audio/Video controller/coprocessor (A/V controller/ coprocessor) 32 electronics are largely contained within one massive custom logic chip, known as an ASIC (Application Specific Integrated Circuit). An A/V controller/coprocessor 32 meeting the description herein can be purchased from MSU Ltd., 270 Upper 4th Street, Witan Gate West, Central Milton Keynes, MK9 1DP England. The A/V controller/ coprocessor 32 contains a processor interface 60, a processor cache 62, a memory interface/refresh 64, a video controller 66, an interrupt controller 68, a video blitter 70, an optional CD block decoder, a digital signal processor (DSP) 74, and a DSP memory 76. The processor interface 60, the memory interface/refresh 64, and the video controller 66 are referred to collectively as the video/memory controller 67. The system memory 33, central processing unit 30, and other devices lie outside the A/V controller/coprocessor 32.

The A/V controller/coprocessor 32 generates the SYSTEM' bus 34 from the SYSTEM bus 31, thereby isolating the CPU 30 from the system memory 33. Thus, the SYSTEM' bus 34 electrically connects the various devices to the system memory 33. Sharing the SYSTEM' bus 34 are six possible bus masters (in order from highest priority to lowest priority, respectively): the memory refresh 64, the video controller 66, an optional CD block decoder (not shown), the DSP 74, the blitter 70, and the CPU 30 (through the processor interface 60). Only one of the bus masters can control the SYSTEM' bus 34 at any one time. The arbitrator within the video/memory controller 67 controls the changing priorities of the devices, as described herein, and is in electrical circuit communication with all the devices within the A/V controller/coprocessor 32. For example, the CPU 30 has the lowest priority of all bus masters until an interrupt occurs. Thus, the arbitrator is in circuit communication with both the CPU interface 60 and the interrupt controller 68.

The cache 62 is not a cache in the sense that it prefetches instructions for the CPU 30. Rather, the cache 62 is a 512×16-bit static RAM located at F14000H to F143FFH that can be used by the CPU 30 for variables, stack, or program code to speed up program execution.

The video/memory controller 67 (the processor interface 60, the memory interface/refresh 64, and video controller 66) controls the SYSTEM' bus 34, and provides the memory timing signals (e.g., CAS, RAS, write enable, etc.) for memory devices attached to the SYSTEM' bus 34, as is well known in the art. It suspends bus master operations during video lines for brief periods to fetch any video display data, and to refresh dynamic RAM (DRAM). It also controls the interface with the CPU 30.

The video controller 66 has a flexible video timing generator that can be programmed to suit different TV standards and monitors up to a 640 by 480 VGA standard. The exact video format is controlled by setting various registers in the A/V controller/coprocessor: horizontal period, horizontal sync, horizontal blanking end, horizontal blanking begin, horizontal display begin, horizontal display end, horizontal fetch begin, horizontal fetch end, horizontal vertical sync, vertical period, vertical sync, vertical blanking end, vertical blanking begin, vertical display begin, vertical display end, video interrupt, and light pen registers. The video controller 66 has three color resolutions available: four bits per pixel, eight bits per pixel, and 16 bits per pixel. The memory map of the screen is not tied to the video display width, but is defined independently.

The video/memory controller 67 decodes the 16 megabyte address range of the 80376 CPU 30 into the following memory map: 1 MB of system RAM (000000H–0FFFFFH), 4 MB for the first cartridge ROM (400000–7FFFFFH), 4 MB for the second cartridge ROM (800000–BFFFFFH), 64 KB of internal memory for the audio/video controller/coprocessor (F10000H–F1FFFFH), and a 128 KB block of system ROM (FE0000H–FFFFFFH). The 64 kilobytes of internal memory comprises palette RAM, blitter registers, and DSP registers and memory. The palette address range was stated above. The blitter registers extend from the range F10400H to F107FFH. The DSP memory extends from F10800H to F18000H.

if the optional CD drive is added to the system, the following regions are added to the memory map: another 1 MB of system RAM (100000H–1FFFFFH) and 128 KB for the CD drive (FC0000H–FDFFFFH).

The interrupt controller 68 interfaces six internal interrupts to the CPU 30: video interrupt (highest priority), analog interrupt 0 (AI0), analog interrupt 1 (AI1), analog interrupt 2 (AI2), CD block decoder interrupt, and DSP interrupt (lowest priority). The interrupt controller automatically clears an interrupt when the CPU 30 performs the interrupt acknowledge cycle. A mask bit is available for each of the interrupts.

The blitter 70 is a graphics processor for fast screen updates and animation, acting as a hardware graphics subroutine for the CPU 30 or DSP 74. It executes commands written by the CPU 30 and the DSP 74 into memory. It can perform arbitrarily long sequences of graphics operations by reading new command sets from system memory 33. It becomes bus master through blitter program operation, and can therefore have exclusive control of the SYSTEM' bus 34 for considerable periods. However, its priority over the CPU 30 is not absolute; it can be requested to give up the SYSTEM' bus 34 to the CPU 30 when an interrupt occurs. The CPU 30 is the lowest priority bus master at the system level; however, it has complete control of the other hardware, therefore, the use of the SYSTEM' bus 34 is entirely under CPU 30 program control.

The blitter 70 has a versatile comparator to allow intelligent blitting operations, and a logic function unit (LFU) to generate the output data. The logic function unit can combine the contents of the data registers in a number of useful ways to produce the output data and the comparator can perform certain comparisons on the data to inhibit write operations, and optionally stop blitter operation.

The logic function unit generates the output data, which is written to the destination in system memory 33. It can perform any logical combination of the source and destination register pixels. "Source data pixels" can be selected from either of the source data register or the data pattern data register. The LFU selects any of the four Boolean minterms (A & B, $\overline{A}$ & B, A & $\overline{B}$, and $\overline{A}$ & $\overline{B}$) of the two sets of input data from the data registers, and generates the logical OR of the two selected minterms. This allows any logical combination of input data; thus 16 functional possibilities exist.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator can also be used to provide a pixel plane effect, to give transparent colors, for collision detection and system memory 33 search operations, and as an aid to character painting.

The DSP 74 is a simple, very high-speed processor for sound synthesis, operating at up to 33 million instructions per second (MIPs). It has access to the SYSTEM' bus 34 via a DSP DMA controller (not shown), which allows it to read and write bytes or words into system memory 33. These transfers occur in short bursts, and are under DSP program control. The DSP 74 actually executes programs and stores data in its own private high-speed memory 76.

The DSP 74 audio coprocessor is a general purpose arithmetic coprocessor with sufficient power to implement a high performance music synthesizer. Synchronous serial outputs are provided for a generation of stereo audio signals with 16 bit precision, giving a sound quality normally associated with compact disc technology. The DSP 74 is micro-programmable from the host CPU 30 and the instruction set is sufficiently flexible to enable the user to program the device to fulfill many different functions that are quite different from that of "music synthesizer." Such applications might include algorithmic speech generation, audio analysis using fast Fourier transform techniques, and three-dimensional graphics rotations. The DSP 74 uses Harvard architecture (separate program and data buses) for maximum data throughput. The DSP 74 has an arithmetic logic unit (ALU), which features a hardware 16-bit by 16-bit hardware multiply/accumulate as well as addition, subtraction, and logical functions. There is also a separate serial divide unit, which generates one quotient bit per tick.

The ALU within the DSP 74 is a 16-bit arithmetic logic unit, with the same functions as a Texas Instruments 74181, which is well known in the art. Common arithmetic operations are encoded as instructions; uncommon instructions can be performed by directly setting up the ALU mode bits with the general purpose arithmetic instruction (GAI).

The DSP 74 has a DSP memory 76 associated with it. The DSP memory 76 comprises program RAM, data RAM, a register/constant table, and a sine ROM (all not shown). The DSP memory 76 in general is accessible in both the DSP's internal address space as well as the address space of the system memory 33. The DSP program RAM is 512 18-bit words. These locations can only be written by the CPU 30, and are program read-only as far as the DSP 74 is concerned. Program RAM does not appear in the DSP internal address space. The program RAM is not accessible to the host when the DSP 74 is running, but is accessible when the DSP is idle.

The DSP 74 also has a serial audio digital-to-analog convertor (DAC) interface. The serial DAC interface allows the DSP 74 to both drive a synchronous serial ($I^2S$ or similar) DAC, and to input data from a synchronous serial data source such as a CD drive.

Figure 1C:
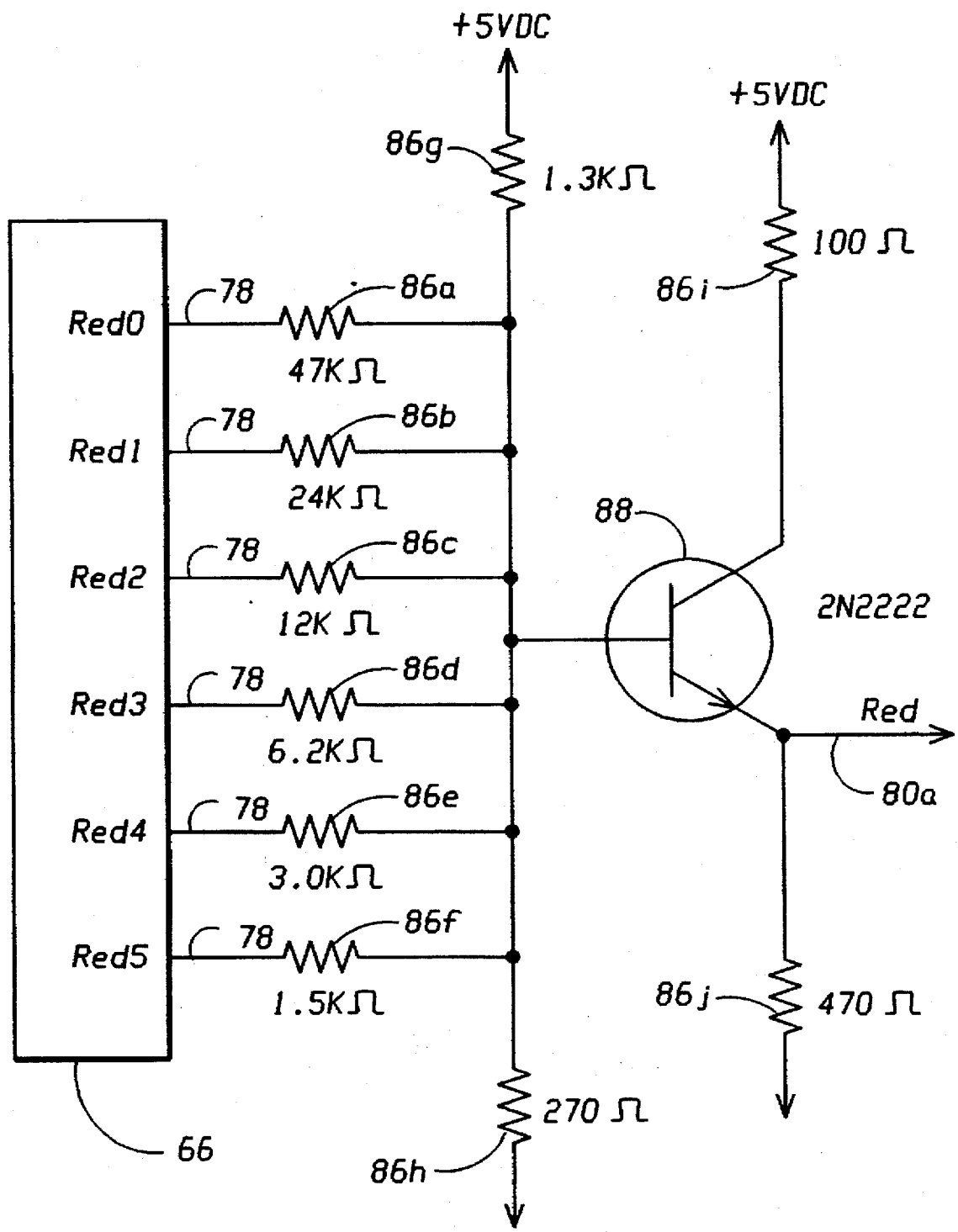
FIG. 1C is a schematic diagram showing the details of the video digital to analog converter used in the system of the present invention.

The video controller 66 of the A/V controller/coprocessor 32 connects to the external video DAC 50, which converts the eighteen bits of pixel information 78 (six bits each of red, green, and blue) from the video controller 66 into an RGB signal 80, as is well known in the art. Each color channel (R 80a, G 80b, and B 80c) of the video DAC 50 is implemented with an R2R resistor tree and a 2N2222 transistor, as shown in FIG. 1C. The devices in FIG. 1C are in circuit communication, as shown. The resistors 86a–86j in FIG. 1C are all 0.25 watt resistors with the values shown, within 5% tolerance. The transistor 88 is a 2N2222.

Referring once again to FIG. 1B, the RGB signal 80 is converted to an NTSC composite video signal 90 by the NTSC/PAL encoder 52. The NTSC/PAL encoder 52 accepts the chroma clock 92, the HSYNC and VSYNC signals 94, which are generated by the video controller 66 of the A/V controller/coprocessor 32, and the red 80a, green 80b, and blue 80c video outputs, which are generated by the video DAC 50, and generates a composite video signal 90 in the well known NTSC or baseband video format. In the alternative, the well known PAL (European television signal standard) format can be generated. The composite video signal 90 is connected to external devices with a single female RCA type phono jack (not shown), as is well known in the art. In the preferred embodiment, the NTSC/PAL encoder 52 is a CXA1145, manufactured by Sony Corp. In the alternative, an MC1377, manufactured by Motorola Corp. can be used.

The audio ADC/DAC/CODEC 54 is linked to the DSP 74 with a serial link 96 conforming to the well known Philips I²S protocol. The ADC/DAC/CODEC 54 converts analog data to digital data, and vice versa, and compresses and decompresses digital data. The ADC/DAC/CODEC 54 interfaces external stereo analog data 97a–97b from optional microphones to the A/V controller/coprocessor 32. The audio inputs 97a–97b are connected to external devices with a standard stereo ¼" connector. The audio ADC/DAC/ CODEC 54 also interfaces digital data from the A/V controller/coprocessor to external devices by generating left and right audio line out signals 98a–98b. These signals 98a–98b are connected to external devices, such as optional speakers (not shown) with two female RCA phone jacks, as are well known in the art. As mentioned below, the audio line signals 98a–98b are also added to the RF video signal 22.

In the preferred embodiment, the ADC/DAC/CODEC 54 is a CS4216, manufactured by Crystal Semiconductor. The part contains microphone inputs, with programmable gain, as well as outputs with programmable attenuators. Gain and attenuation are both programmably controlled by the DSP 74.

In the alternative, the ADC/DAC/CODEC 54 can be replaced with a TDA1311 DAC manufactured by Philips. If this chip is used, the ADC and CODEC functions will not be available.

The RF modulator 56 merges the composite video signal 90 from the NTSC/PAL encoder 52 with the left and right audio line out signals 98a and 98b from the audio ADC/ DAC/CODEC 54 onto a carrier frequency to generate an RF video signal 22 that is suitable for being directly inputted into the TV 16. To generate the different PAL (European television signal standard) and NTSC formats a different RF modulator and crystal must be used. The RF video signal 22 is connected to external devices with a single female Type F coaxial connector, as is well known in the art.

Figure 2B:
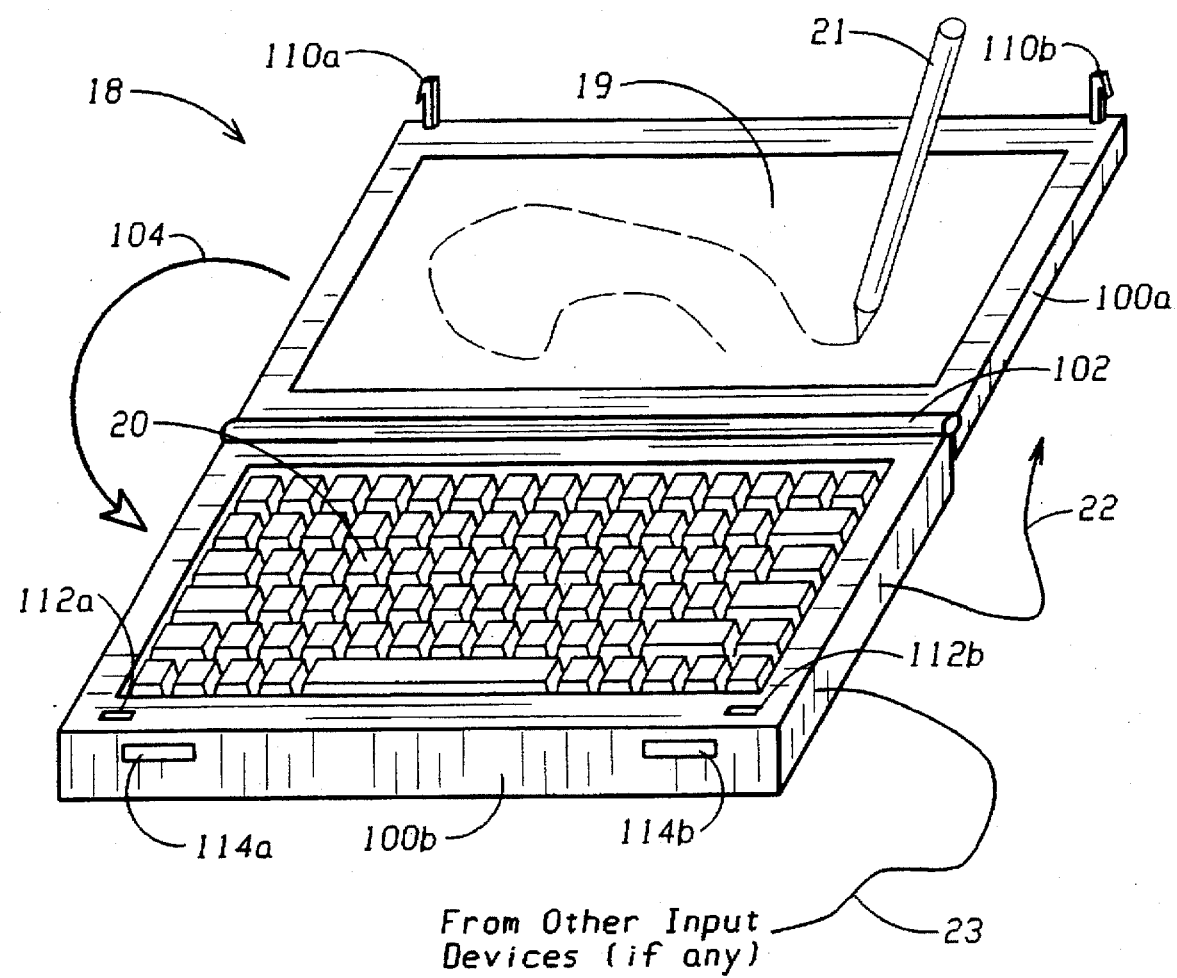
FIG. 2B is a side elevational view of the embodiment of the input device of the present invention shown in FIG. 2A.
Figure 2B:
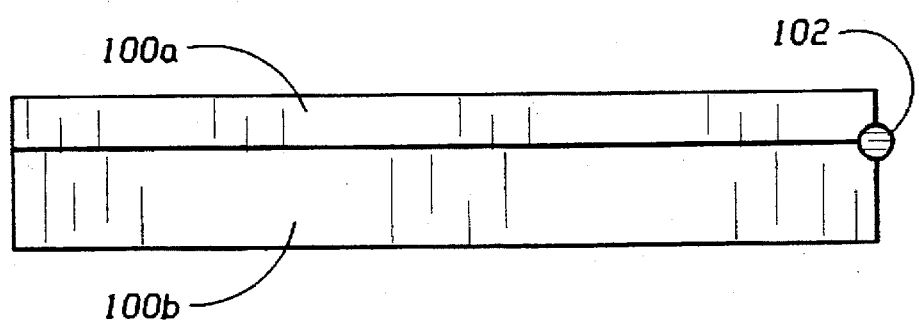

Referring now to FIGS. 2A, 2B, one embodiment of the input device 18 of the present invention is shown. As shown in that figure, the input device 18 comprises a touchpad 19 and a keyboard 20 enclosed in a single enclosure 100.

The enclosure 100 is a bivalve or "clamshell" enclosure having two halves 100a, 100b and is made of ABS-T (acrylonitrile-butadiene-styrene; available from Wong's Electronics Co. LTD., Wongs Industrial Centre, 180 Wai Yip Street, Kwun Tong, Kowloon, Hong Kong, as material ABS, grade T) or any other suitable rigid, formable material. The two halves 100a, 100b are connected to one another by a hinge 102, which is configured to allow motion (indicated at 104) of the one half 100a relative to the other half 100b along an axis parallel to the hinge 102. The hinge 102 permits relative motion of the two halves 100a, 100b to the extent that the two halves can occupy the closed configuration shown in FIG. 2B. The hinge 102 can be molded into the enclosure halves 100a, 100b, as is well known in the art of "notebook" computer design, or can be any other suitable hinge such as a "piano" hinge affixed to the halves 100a, 100b by standard methods. In this embodiment, the hinge 102 must be configured to allow the circuitry in the one half 100a to be in circuit communication with the other half 100b so that the signals from the circuitry in the one half 100a can be transmitted to the processing unit 12 via the common link 22, which is connected to the other half 100b.

The two halves 100a, 100b are secured in the closed position of FIG. 2B by standard latching devices known in the art of notebook computer design. In one embodiment, latches 110a, 110b are physically annexed to one enclosure half 100a. The latches 110a, 110b penetrate slots 112a, 112b and engage catches (not shown), which are controlled by a pair of slides 114a, 114b. The slides 114 slide in grooves (not shown) and move the catches into two positions: one in which each catch secures its respective latch and one in which the latch is free to exit its respective slot.

Figure 3A:
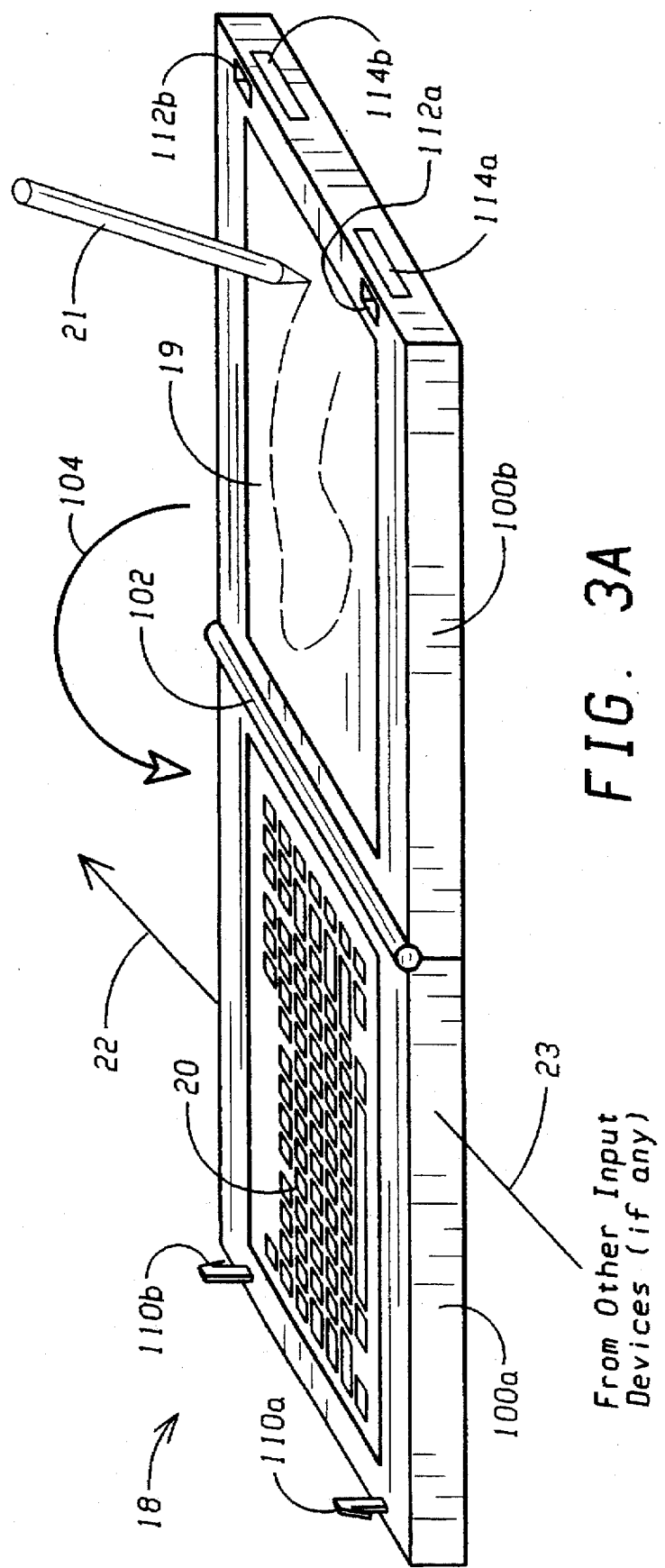
FIG. 3A is a perspective view of another embodiment of the input device of the present invention.
Figure 3B:
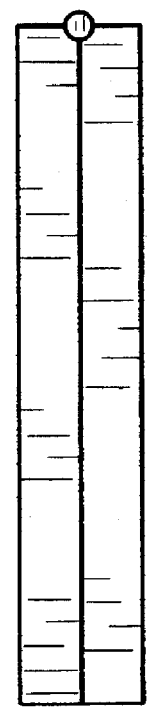
FIG. 3B is a side elevational view of the embodiment of the input device of the present invention shown in FIG. 3A.

FIGS. 3A and 3B show another embodiment of the input device 18 of the present invention. As shown in FIG. 3A, in this embodiment the touchpad 19 and keyboard 20 are hinged by a hinge 102 on their sides in such a manner that they are positioned side-by-side when the keyboard 20 is facing the user in the normal way. This embodiment differs from the embodiment of FIGS. 2A and 2B in that the keyboard 20 of FIG. 3A is actually a second touchpad with a graphical image of a QWERTY or other keyboard inscribed in or on the second touchpad. In the alternative, a keyboard with individual, movable keys can be used in this side-by-side embodiment with the touchpad 19. This embodiment of the input device 18 folds into the closed configuration shown in FIG. 3B.

As with the other embodiment, the two halves 100a, 100b are secured in the closed position of FIG. 3B by standard latching devices known in the art of notebook computer design. In one embodiment, latches 110a, 110b are physically annexed to one enclosure half 100a. The latches 110a, 110b penetrate slots 112a, 112b and engage catches (not shown), which are controlled by a pair of slides 114a, 114b. The slides 114 slide in grooves (not shown) and move the catches into two positions: one position in which each catch matingly engages and thereby secures its respective latch and one position in which the latch is free to exit its respective slot.

Figure 4:
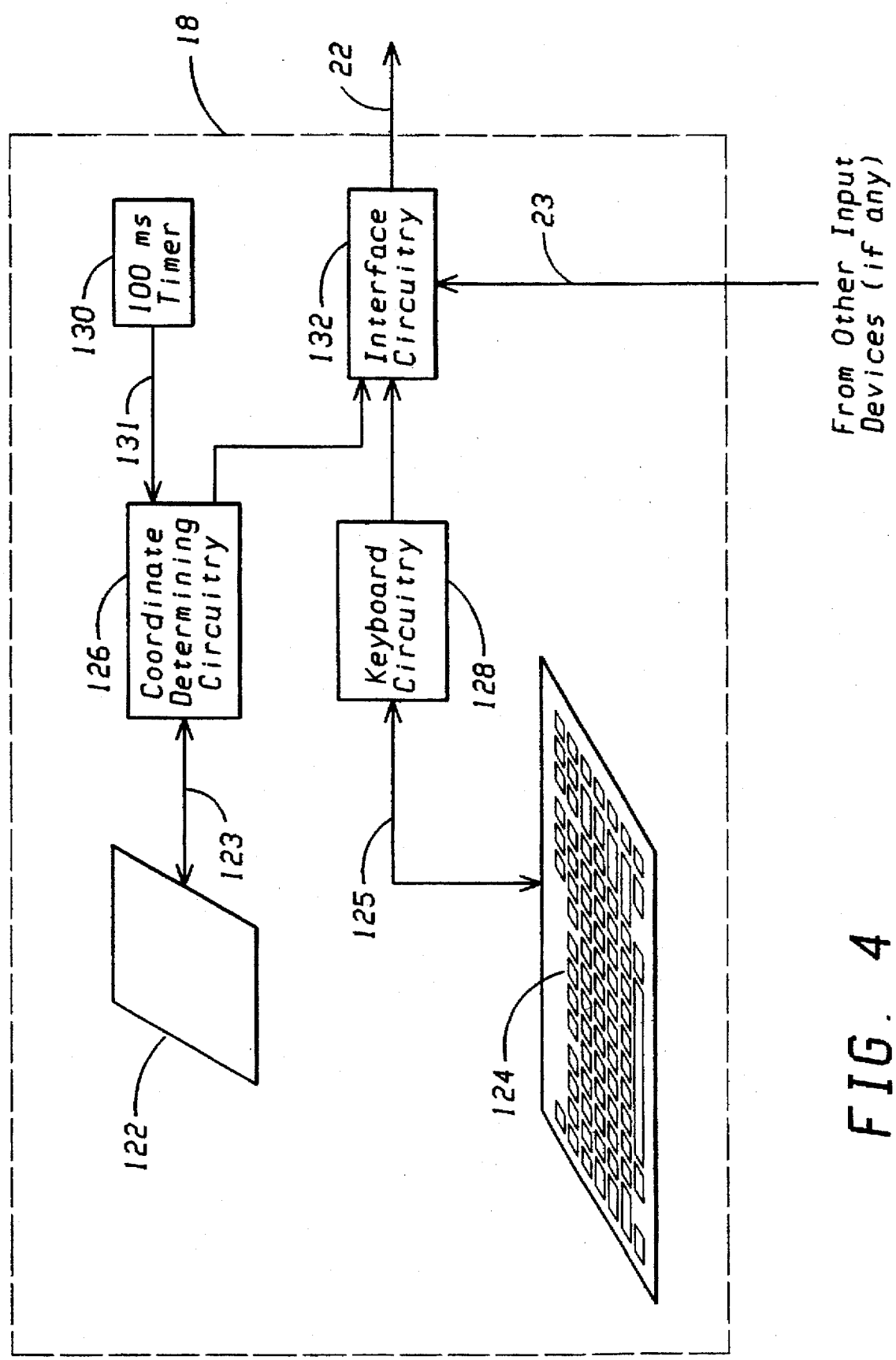
FIG. 4 is a block diagram showing the electrical circuitry of the input device of the present invention.

Referring now to FIG. 4, a block diagram of the circuitry within the input device 18 is shown. The input device 18 comprises the coordinate type sensor 122, the keyboard sensor 124, coordinate determining circuitry 126, keyboard circuitry 128, a 100 millisecond timer 130, and interface circuitry 132, all connected in electrical circuit communication as shown in FIG. 4.

The touchpad sensor 122 is configured in such a manner that pressure on or near the sensor surface by the finger, stylus 21, or the like allows the sensor 122 to detect the location of the touch. The touchpad sensor 122 can be any one of many types, such as impedance-based sensors, acoustic sensors, and switch closure type sensors. Examples include membrane switch matrixes, e.g., the device disclosed in U.S. Pat. No. 4,736,190 to Florella, and finer resolution switch closure type sensors, e.g., the device disclosed in U.S. Pat. No. 4,529,959 to Ito et al. One suitable sensor 102 can be purchased from Wong's Electronics Co. LTD., Wongs Industrial Centre, 180 Wai Yip Street, Kwun Tong, Kowloon, Hong Kong, as part number PR39983.

The sensor 122 generates at least one electrical signal 123 responsive to the stylus 21, finger, or the like touching the sensor surface or touching a template overlay proximate to the sensor surface. For example, switch closure type sensors typically require a number of drivers to sequentially drive the many lines on one axis and a number of receivers to detect which of the lines on the other axis is conducting the signal driven by the drivers. Knowing which driver generated the signal detected by which receiver allows one to determine the location of the touch causing the switch closure.

The keyboard sensor 124 can be any one of many suitable sensors, which are well known in the arts of keyboard design and notebook computer design. In addition, the keyboard sensor can be a second coordinate type sensor with a template graphic design of a QWERTY or other keyboard inscribed in or on the surface. The keyboard sensor 124 generates an electrical signal 125 responsive to closure events of the keys of the sensor 124.

The coordinate determining circuitry 126 is in circuit communication with the coordinate sensor 122, the interface circuitry 132, and the 100 millisecond timer 130. The coordinate determining circuitry 126 is configured to accept the electrical signals 123 from the coordinate sensor 122 and determine the X-axis and Y-axis values corresponding to the location of the touch by the finger, stylus 21, or the like. For example, if the coordinate sensor 122 is a switch-type sensor, then the coordinate determining circuitry 126 will comprise drivers and receivers to determine which switch is closed, as are well known in the art, and logic to translate the location of that switch to a meaningful value relative to the sensor surface.

The keyboard circuitry 128 is in circuit communication with the keyboard sensor 124 and the interface circuitry 128. The keyboard circuitry 128 accepts the electrical signal 125 from the keyboard sensor 124, determines which key was touched, and generates a message corresponding to the keystroke.

The 100 millisecond timer 130 is in electrical circuit communication with the coordinate determining circuitry 126. The timer 130 repeatedly determines the expiration of a 100 millisecond period of time and generates a signal 131 that indicates the expiration of the period. The coordinate determining circuitry 126 uses the signal 131 to detect a change in the touch location of the finger, stylus 21, or the like between expirations of the 100 millisecond periods detected by the timer 130.

The interface circuitry 132 is in circuit communication with the coordinate determining circuitry 126, the keyboard circuitry 128, the data processing unit 12 (via the serial data line 22), and other input devices, if any, via the serial data line extension 23. The interface circuitry 132 accepts the coordinate values determined by the coordinate determining circuitry 126, the keystroke message generated by the keyboard circuitry 128, and the messages generated by the direction determining circuitry 206 and transmits any such information to the data processing unit 12 via the serial data link 22.

All input devices are daisy chained to the processing unit 12. Thus, the interface circuitry must pass any packets from other input devices on to the CPU 30. As will be explained more fully below, each input device connected to the processing unit 12 has a unique device number. The device closest to the processing unit 12 has a device number of 0, and the farther away from the processing unit 12 a device is, the higher its device number is. However, the input devices are not aware of their own or other devices' device numbers. Thus, each device must add one to the device number of any data packet passed from other input devices of the same type. Any input device in the chain with a device number greater than fifteen is ignored.

For example, assume that three input devices of the same type α, β, and γ are connected to the processing unit 12 as follows: α is connected to the processing unit 12, β is connected to α, and γ is connected to β. Therefore, e has a device number of 0, α has a device number of 1, and γ has a device number of 2. The other devices are not aware of their own or other device numbers. Each device sends its own data packets with a device number of 0.

When α passes a data packet to the processing unit 12, the default device number of 0 is correct, because α is closest to the processing unit 12. However, β and γ also send data packets with a device number of 0. To remedy the situation, each device adds one to the device number of packets passed on. Thus, when β passes a data packet from γ to α, β adds one to the device number, thereby giving the packet from γ a device number of 1. Likewise, when α passes the γ data packet to the processing unit 12, α adds one to the device number, thereby giving the packet from γ a correct device number of 2. Thus, each device in the chain adds one to the device number of each data packet from devices of the same type passed on to the next device.

Therefore, in addition to passing on data packets received from other input devices (if any), the interface circuitry 132 adds one to the device number in any data packets from devices of the same type received via the serial data line extension 23. The interface circuitry 132 passes the data packets with modified and unmodified device numbers to the data processing unit 12.

Using the system 10 with the input device 18 of the present invention is very straightforward. The input devices send data packets to the data processing unit 12 via the serial link 22. As mentioned above, the input devices interface to the CPU 30 via the I/O coprocessor 36. Each input device is daisy chained to the next input device. The I/O coprocessor 36 receives the data packets and stores them in a first-in-first-out (FIFO) manner.

Every 50 msec "tick" the I/O coprocessor 36 interrupts the CPU 30. In response, the CPU accesses the single byte at I/O port AS0 of the coprocessor 36 to determine the number of ticks since the last access by the CPU and the number of device messages to be transferred, as explained above. The ten types of device messages are shown in the table below.

TABLE

Input Device Message Structures

| Device Type | Byte 0 (Count) | Byte 1 (Device ID) Bits 4–7 | Byte 1 (Device ID) Bits 0–3 | Byte 2 | Byte 3 | Byte 4 |
|---|---|---|---|---|---|---|
| Keyboard (PS/2) | 2 | 0 | 0 | Scan Code | N/A | N/A |
| Mouse (PS/2) | 4 | 1 | 0 | Mouse Byte 1 (Buttons) | Mouse Byte 2 (X Data) | Mouse Byte 3 (Y Data) |
| Switch Closure | Variable 1–255 | Device Number in Chain | 1 | Button States 0: Open 1: Closed | Button States (Optional) | Button States (Optional) |
| Joystick (Digital) | 2 | Device Number in Chain | 2 | Switch Closure /Open Code | N/A | N/A |
| Coordinate (Relative) | 4 | Device Number in Chain | 3 | Button States | Delta X | Delta Y |
| Coordinate (Absolute) | 4 | Device Number in Chain | 4 | Button States | X Coord. | Y Coord. |
| Touchpad Overlay Message | 2 | Device Number in Chain | 5 | Overlay Code (0–63) | N/A | N/A |
| Action Message | Variable 1–255 | Device Number in Chain | 6 | Action Button Data | (Optional) | (Optional) |
| System Pass-through | Variable 1–255 | Device Number in Chain | 14 | Byte 0 | Byte 1 (Optional) | Byte 2 (Optional) |
| Initialization Message | Variable 1–255 | Device Number in Chain | 15 | Device Type (ID) | Mfg Code Byte 0 | Mfg Code Byte 1 (Optional) |

As seen in the table, the message structures are of different length and have structures closely related to the input devices to which they correspond. The device messages in the table are the same for the data sent to the I/O coprocessor from the individual I/O devices as the data sent to the CPU by the I/O coprocessor. In addition to the structures shown above, each message from an I/O device to the I/O coprocessor has a checksum to ensure uncorrupted data is sent from the input device 18 to the processor unit 12. The checksum is a standard modulo 256 checksum in which the checksum value is the value needed to make the sum of all the bytes zero (ignoring any carry during the summation). The I/O coprocessor strips off the checksums before sending the data to the CPU. Therefore, the stream of bytes read by the CPU is virtually identical to the stream of bytes received by the I/O coprocessor, with the following exceptions: (1) the first byte read by the CPU is the special byte containing the number of ticks and the number of I/O device messages and (2) the checksums are missing.

The PS/2 mouse and keyboard devices are supported as device type 0. The Keyboard has a chain number of 0 and the mouse has a chain number of 1. These devices are supported by the I/O coprocessor using the existing PS/2 protocol via the serial data link 22.

Device type 1 is intended for devices with multiple buttons. Up to 255 bytes (8 buttons per byte) or 2040 buttons can be input to the system using this message type. Open buttons are sent as a logical ZERO while closed buttons are sent as a logical ONE. This is a variable length message.

Digital joysticks, such as joysticks 20a, 20b are supported as device type 2. There are two joysticks associated with each touchpad 19. Each joystick has a unique chain number. Each left joystick is odd (1, 3, 5, 7, 9, etc.) and each right joystick is even (0, 2, 4, 6, etc.). Each joystick is reported independently. The message is a fixed length message. Recall that digital joysticks sensors comprise a number of switches 150a–150d. The message is a byte representing up to eight switches, which include the movement sensor switches 150a–150d and data input switches, such as switch 130a. The individual bits of the message byte for this type represent: up switch (MSB), down switch, left switch, right switch, switch #1, switch #2, switch #3, and switch #4 (LSB). The joysticks 20a, 20b included with the touchpad 19 only have one button 130, which corresponds to switch #1 above. The other three buttons are always reported as zero.

Coordinate devices such as mice and trackballs are reported as device type 3. The first byte following the ID is to report any button information for the device. Up to 8 buttons can be reported. The next byte is a delta X value followed by a delta Y value. The delta X and Y values are based on the last reported position of the device. The application programs must convert these values to absolute coordinates, if necessary. The maximum movement is 255. If the actual movement exceeds 255, then two or more messages will be sent. This is a fixed length message.

The touchpad 19 is supported as device type 4. Other devices in this device type include analog joysticks. The first byte following the ID is used to report button information. The next byte is used to report the absolute X position. The absolute Y position is next in sequence. The absolute X and Y values are each 1 byte and are limited to a range of 0–255. This is a fixed length message.

Touchpad overlays 102 are reported as device type 5. Touchpad overlays are sensed using the 6-bit sensor 124 in the touchpad. When an overlay change is sensed by the touchpad, a message is generated. All overlay codes are application-dependent and the application program must recognize the codes of each overlay. This message is a fixed length message.

The action message is used to define a common set of predefined device-independent functions that can be generated by multiple device. types in different ways but are used and interpreted by the system and application programs in the same way. Action messages are reported as device type 6 using a variable length message. In this particular embodiment, three device-independent functions are defined and associated with the lower three bits of this byte: START (start an activity or process), PAUSE (pause an activity or process), and SELECT (select one of multiple events or actions), respectively. The bits are set to report these functions. All other bits are reserved for future use and are reported as zero to the CPU.

The system pass-through message type is used to handle any device types not applicable to any previously defined device types. Message type 14 is used. This is a variable length message. Definition of the data is device-dependent and must also be application specific.

The first message from each device is device type 15. This is used to tell the system that a device will send input messages. This message also defines the future device type that will be used to report input. This is a variable length message.

On system power up and 50 ms intervals, the I/O coprocessor scans the cartridge and expansion sense lines to determine the configuration and alert the system and sends a configuration byte to the CPU. This is the first byte the CPU receives from the I/O coprocessor on power up. The I/O coprocessor will only generate a module configuration interrupt when a change is sensed; a change in cartridge status causes a system reset, thereby causing the I/O coprocessor to send another configuration byte to the CPU. The appropriate bits set in the byte sent are set to indicate the presence of the associated item: bit 0 corresponds to cartridge 1, bit i corresponds to cartridge 2, and bit 2 corresponds to the optional CD drive. The other bits are set to ZERO.

In addition, the CPU can transmit data to the I/O devices via the serial link 22 by writing the information to the I/O coprocessor 36. Data bytes are written to I/O port AS0 with each byte prefaced by the byte 03H. The I/O coprocessor writes these bytes to the I/O devices. This capability is used to send data to, for example, a printer (not shown).

Interfacing to the input device having a touchpad and a keyboard of the present invention is also straightforward. An interrupt handler executing on the CPU 30 from the system BIOS receives data from the input devices via the I/O coprocessor 36. The interrupt handler merely places any transmissions from the I/O coprocessor 36 into memory 33. Application programs executing on the CPU 30 poll the operating system BIOS periodically via a software interrupt to determine if any inputs were received. If so, they are communicated to the application programs by the operating system in response to the software interrupt.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. For example, the coordinate determining circuitry 126, keyboard circuitry 128, 100 ms timer 130, and the interface circuitry 132 can all be implemented in a single microcontroller. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. An input device for use with a computer system having a processor enclosed in a central enclosure, said input device comprising:

(a) a hinged bivalve enclosure separate from said central enclosure, said hinged bivalve enclosure including a first housing, a second housing, and a hinge joining said first and second housings for pivotal movement of said housings one relative to the other between at least an open position and a closed position;

(b) a keyboard sensor having a plurality of keys, said keyboard sensor generating a keyboard electrical signal responsive to a closure event of each of said plurality of keys, each of said plurality of keys having a key touch surface a touching of which causes the closure event, said keyboard sensor being affixed to said first housing;

(c) keyboard circuitry in circuit communication with said keyboard sensor, said keyboard circuitry receiving the keyboard electrical signal from said keyboard sensor and determining therefrom which key was touched;

(d) a touchpad sensor generating a touchpad electrical signal, said touchpad sensor having a touch surface, with the touchpad electrical signal corresponding to a touched portion of said touch surface of said touchpad sensor, said touchpad sensor being affixed to said second housing, said touchpad sensor being oppositely disposed from said keyboard sensor in said closed position with said touch surface of said touchpad sensor facing said plurality of key touch surfaces;

(e) coordinate determining circuitry in circuit communication with said touchpad sensor, said coordinate determining circuitry receiving the touchpad electrical signal from said touchpad sensor and determining therefrom the location of the touched portion of said touch surface of said touchpad sensor; and (f) interface circuitry in circuit communication with said keyboard circuitry and said coordinate determining circuitry, said interface circuitry transmitting to said processor a first type of data packet corresponding to one of the closure events of said keys of said keyboard sensor and a second type of data packet corresponding to the location of a touched portion of said touch surface of said touchpad sensor, and said interface circuitry acting as a multiplexer between said keyboard circuitry and said coordinate determining circuitry.

2. An input device according to claim 1 further comprising at least one insulated signal conductor of a predetermined length extending between said hinged bivalve enclosure and said central enclosure, said at least one insulated signal conductor placing said interface circuitry in circuit communication with said processor for transmission of the data packets thereto.

3. An input device according to claim 1 wherein said keyboard sensor and said touchpad sensor are positioned side-by-side during use.

4. An input device according to claim 1 wherein said interface circuitry includes circuitry to receive data packets from at least one other input device and further includes circuitry to transmit the received data packets to said processor.

5. An input device according to claim 1 wherein said at least one other input device comprises a joystick.

6. An input device according to claim 4:
(a) wherein each transmitted data packet originated by said interface circuitry of said input device includes a device identifier corresponding to said input device;
(b) wherein each data packet received by said interface circuitry from said at least one other input device includes a device identifier corresponding to said at least one other input device from which the data packet originated; and
(c) wherein said interface circuitry comprises circuitry to change the device identifier of each data packet received from said at least one other input device before said interface circuitry transmits the changed data packet to said processor, thereby ensuring that data packets received from said at least one other input device and transmitted to said processor have a different device identifier than data packets originated by said input device.

7. An input device according to claim 6 wherein said circuitry to change the device identifier of each data packet received from said at least one other input device adds a particular value to the device identifier of data packets received from said at least one other input device before said interface circuitry transmits the changed data packet to said processor.

8. An input device according to claim 1 wherein said processor comprises a central processing unit in circuit communication with an I/O processor, with said I/O processor having circuitry to receive transmitted data packets.

9. An input device according to any one of claims 2, 4, 5, 6, or 7 wherein said keyboard sensor and said touchpad sensor are positioned side-by-side during use.

10. A system comprising:
(a) a central enclosure;
(b) a processor mounted within said central enclosure;
(c) a memory circuit in circuit communication with said processor and mounted within said central enclosure;
(d) a graphics controller in circuit communication with said processor, said graphics controller having circuitry to generate at least one electrical signal corresponding to an optical image, and said graphics controller being mounted within said central enclosure;
(e) a radio frequency modulator in circuit communication with said graphics controller, mounted within said central enclosure, and having circuitry to modulate the at least one electrical signal corresponding to an optical image onto a radio frequency carrier suitable for reception and display on a television set;
(f) a hinged bivalve enclosure separate from said central enclosure, said hinged bivalve enclosure including a first housing, a second housing, and a hinge joining said first and second housings for pivotal movement of said housings one relative to the other between at least an open position and a closed position;
(g) a keyboard sensor having a plurality of keys, said keyboard sensor generating a keyboard electrical signal responsive to a closure event of each of said plurality of keys, each of said plurality of keys having a key touch surface a touching of which causes the closure event, said keyboard sensor being affixed to said first housing;

(h) keyboard circuitry in circuit communication with said keyboard sensor, said keyboard circuitry receiving the keyboard electrical signal from said keyboard sensor and determining therefrom which key was touched;
(i) a touchpad sensor generating a touchpad electrical signal, said touchpad sensor having a touch surface, with the touchpad electrical signal corresponding to a touched portion of said touch surface of said touchpad sensor, said touchpad sensor being affixed to said second housing, said touchpad sensor being oppositely disposed from said keyboard sensor in said closed position with said touch surface of said touchpad sensor facing said plurality of key touch surfaces;
(j) coordinate determining circuitry in circuit communication with said touchpad sensor, said coordinate determining circuitry receiving the touchpad electrical signal from said touchpad sensor and determining therefrom the location of the touched portion of said touch surface of said touchpad sensor;
(k) interface circuitry in circuit communication with said keyboard circuitry and said coordinate determining circuitry, said interface circuitry transmitting to said processor a first type of data packet corresponding to one of the closure events of said keys of said keyboard sensor and a second type of data packet corresponding to the location of a touched portion of said touch surface of said touchpad sensor, and said interface circuitry acting as a multiplexer between said keyboard circuitry and said coordinate determining circuitry; and
(l) at least one insulated signal conductor of a predetermined length extending between said hinged bivalve enclosure and said central enclosure, said at least one insulated signal conductor placing said interface circuitry in circuit communication with said processor for transmission of the data packets thereto.

11. The system of claim 10 further comprising a second signal conductor of a second predetermined length for placing said radio frequency modulator in circuit communication with the standard television set and for physically connecting said central enclosure to the standard television set.

12. A system according to claim 10 wherein said interface circuitry includes circuitry to receive data packets from at least one other input device and further includes circuitry to transmit the received data packets to said processor.

13. A system according to claim 12 wherein said at least one other input device comprises a joystick.

14. A system according to claim 12:
(a) wherein each transmitted data packet originated by said interface circuitry of said input device includes a device identifier corresponding to said input device;
(b) wherein each data packet received by said interface circuitry from said at least one other input device includes a device identifier corresponding to said at least one other input device from which the data packet originated; and
(c) wherein said interface circuitry comprises circuitry to change the device identifier of each data packet received from said at least one other input device before said interface circuitry transmits the changed data packet to said processor, thereby ensuring that data packets received from said at least one other input device and transmitted to said processor have a different device identifier than data packets originated by said input device.

15. A system according to claim 14 wherein said circuitry to change the device identifier of each data packet received from said at least one other input device adds a particular value to the device identifier of data packets received from said at least one other input device before said interface circuitry transmits the changed data packet to said processor.

16. A system according to claim 10 wherein said processor comprises a central processing unit in circuit communication with an I/O processor, with said I/O processor having circuitry to receive transmitted data packets.

17. A system according to any one of claims 10, 11, 12, 13, 14, or 15 wherein said keyboard sensor and said touch-pad sensor are positioned side-by-side during use.

* * * * *